(12) United States Patent
Zeng et al.

(10) Patent No.: US 10,166,877 B2
(45) Date of Patent: Jan. 1, 2019

(54) CHARGE CONTROL SYSTEM FOR ELECTRIC VEHICLE AND ELECTRIC VEHICLE

(71) Applicant: BYD COMPANY LIMITED, Shenzhen (CN)

(72) Inventors: Liping Zeng, Shenzhen (CN); Guangming Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 406 days.

(21) Appl. No.: 14/901,112

(22) PCT Filed: Jun. 30, 2014

(86) PCT No.: PCT/CN2014/081154
§ 371 (c)(1),
(2) Date: Dec. 28, 2015

(87) PCT Pub. No.: WO2014/206366
PCT Pub. Date: Dec. 31, 2014

(65) Prior Publication Data
US 2016/0137075 A1   May 19, 2016

(30) Foreign Application Priority Data

Jun. 28, 2013  (CN) .......................... 2013 1 0269952
Dec. 26, 2013  (CN) .......................... 2013 1 0733655

(51) Int. Cl.
*H02J 7/00*   (2006.01)
*B60L 11/18*  (2006.01)
(Continued)

(52) U.S. Cl.
CPC .......... *B60L 11/185* (2013.01); *B60L 3/0069* (2013.01); *B60L 11/1803* (2013.01);
(Continued)

(58) Field of Classification Search
CPC .............. B60L 11/1811; B60L 11/1814; B60L 11/1816; B60L 11/1838; B60L 1/02; B60L 1/14; B60L 1/003
(Continued)

(56) References Cited

U.S. PATENT DOCUMENTS 4,831,381 A     5/1989  Hester
2005/0063205 A1*  3/2005  Stancu .............. H02M 7/53875
                                              363/132
(Continued)

FOREIGN PATENT DOCUMENTS

CN   101917022 A   12/2010
CN   201752075 U   2/2011
(Continued)

OTHER PUBLICATIONS

The World Intellectual Property Organization (WIPO) International Search Report for PCT/CN2014/081154 dated Sep. 25, 2014.
(Continued)

*Primary Examiner* — Richard Isla
*Assistant Examiner* — Johali Torres Ruiz
(74) *Attorney, Agent, or Firm* — Anova Law Group, PLLC

(57) ABSTRACT

A charge control system for an electric vehicle and an electric vehicle are provided. The charge control system includes: a charge-discharge socket (20); a three-level bidirectional DC-AC module (30); a charge-discharge control module (50); a filtering module (70); and a control module (60) connected with a third terminal of the charge-discharge control module (50) and configured to control the charge-discharge control module (50) to turn on, to sample an output voltage of an external grid by using a connection midpoint of filtering capacitors in the filtering module (70) as a reference point, and to control the three-level bidirec-
(Continued)

tional DC-AC module (30) according to the output voltage of the external grid so as to control the external grid to charge the power battery (10), when the external grid is in an angle connection mode and the electric vehicle is a charge-discharge mode.

10 Claims, 12 Drawing Sheets

(51) Int. Cl.

| | | |
|---|---|---|
| *H02J 3/32* | (2006.01) | |
| *H02J 7/02* | (2016.01) | |
| *B60L 3/00* | (2006.01) | |
| *B60L 15/02* | (2006.01) | |
| *H02M 7/487* | (2007.01) | |

(52) U.S. Cl.
CPC ....... *B60L 11/1812* (2013.01); *B60L 11/1818* (2013.01); *B60L 11/1842* (2013.01); *B60L 11/1844* (2013.01); *B60L 11/1846* (2013.01); *B60L 15/025* (2013.01); *H02J 3/32* (2013.01); *H02J 7/022* (2013.01); *B60L 2210/30* (2013.01); *B60L 2210/40* (2013.01); *B60L 2240/30* (2013.01); *B60L 2240/486* (2013.01); *B60L 2240/525* (2013.01); *B60L 2240/547* (2013.01); *B60L 2240/549* (2013.01); *B60L 2250/16* (2013.01); *B60L 2260/26* (2013.01); *B60L 2270/20* (2013.01); *H02M 7/487* (2013.01); *Y02E 60/721* (2013.01); *Y02T 10/643* (2013.01); *Y02T 10/7005* (2013.01); *Y02T 10/7072* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 10/126* (2013.01); *Y04S 30/14* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 2011/0025447 A1* | 2/2011 | Jacobson | .............. | H01F 27/362 |
| | | | | 336/84 C |
| 2013/0176753 A1* | 7/2013 | Swamy | ............... | H02M 1/4216 |
| | | | | 363/37 |
| 2014/0354195 A1* | 12/2014 | Li | ...................... | B60L 11/1816 |
| | | | | 318/139 |

FOREIGN PATENT DOCUMENTS

| | | |
|---|---|---|
| CN | 102201693 A | 9/2011 |
| CN | 202455130 U | 9/2012 |
| CN | 103187770 A | 7/2013 |
| JP | 2010288415 A | 12/2010 |

OTHER PUBLICATIONS

Chen Xueliang, Li Xiaoying. Design of battery charge-discharge control system based on the three-level bi-directional inverter. Industrial Instrumentation & Automation, 2012, pp. 27-30, 41(4).

* cited by examiner

CHARGE CONTROL SYSTEM FOR ELECTRIC VEHICLE AND ELECTRIC VEHICLE

CROSS REFERENCE TO RELATED APPLICATIONS

This application is a national phase entry under 35 U.S.C. § 371 of International Application No. PCT/CN2014/081154, filed on Jun. 30, 2014, which claims priority and benefits of Chinese Patent Application No. 201310733655.5 filed with State Intellectual Property Office, P. R. C. on Dec. 26, 2013, and Chinese Patent Application No. 201310269952.9 filed with State Intellectual Property Office, P. R. C. on Jun. 28, 2013, the entire contents of all of which are incorporated herein by reference.

FIELD

Embodiments of the present disclosure generally relate to an electric vehicle field, and more particularly to a charge control system for an electric vehicle and an electric vehicle including the charge control system.

BACKGROUND

Current electric vehicles often use power batteries with large capacities, which may improve the driving range of electric vehicles. However, a long charging time is required when recharging the battery. Although a charging station can charge the power battery quickly, it still has disadvantages such as high cost and requires a relatively large work area. Thus it is very difficult to increase the density of the charging stations. Besides, due to the limited space in an electric vehicle, the in-vehicle charger is limited by the available space thereof and is often unable to meet the requirement of high charging power.

In addition, to charge a conventional electric vehicle, a dedicated charging pile is required and different circuits need to be constructed for a charging system to accommodate different connection modes of the external power grid. This increases hardware costs. Moreover, the current three-phase charging system of the electric vehicle only accommodates the star—type connection mode, which reduces the usability of the charging system.

SUMMARY

Embodiments of the present disclosure seek to solve at least one of the problems existing in the related art to at least some extent.

According to embodiments of a first broad aspect of the present disclosure, a charge control system for an electric vehicle is provided. The charge control system includes: a charge-discharge socket; a three-level bidirectional DC-AC module having a first DC terminal connected with a first terminal of a power battery of the electric vehicle and a second DC terminal connected with a second terminal of the power battery; a charge-discharge control module having a first terminal connected with an AC terminal of the three-level bidirectional DC-AC module and a second terminal connected with the charge-discharge socket; a filtering module connected between the AC terminal of the three-level bidirectional DC-AC module and the charge-discharge control module; and a control module connected with a third terminal of the charge-discharge control module and configured to control the charge-discharge control module to turn on, to sample an output voltage of an external grid by using a connection midpoint of filtering capacitors in the filtering module as a reference point, and to control the three-level bidirectional DC-AC module according to the output voltage of the external grid so as to control the external grid to charge the power battery, when the external grid is in an angle connection mode and a current working mode of the electric vehicle is a charge-discharge mode.

The charge control system for electric vehicle according to embodiments of the present disclosure may accommodate different grid systems, thus effectively improving a universality of a charging system for the electric vehicle, and increasing an applicability of the electric vehicle. In addition, by employing the three-level bidirectional DC-AC module, a common-mode voltage is reduced, a leakage current is decreased and a harmonic wave is weakened. Furthermore, a DC-DC voltage increasing and decreasing module is not necessarily required, thus realizing a high power charging, reducing a bus voltage, improving a driving efficiency and shortening a charging time.

According to embodiments of a second broad aspect of the present disclosure, an electric vehicle is provided. The electric vehicle includes the charge control system according to embodiments of the first broad aspect of the present disclosure.

The electric vehicle according to embodiments of the present disclosure may accommodate different grid systems, thus effectively improving a universality of a charging system for the electric vehicle, and increasing an applicability of the electric vehicle. In addition, by employing the three-level bidirectional DC-AC module, a common-mode voltage is reduced, a leakage current is decreased and a harmonic wave is weakened. Furthermore, a DC-DC voltage increasing and decreasing module is not necessarily required, thus realizing a high power charging, reducing a bus voltage, improving a driving efficiency and shortening a charging time.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
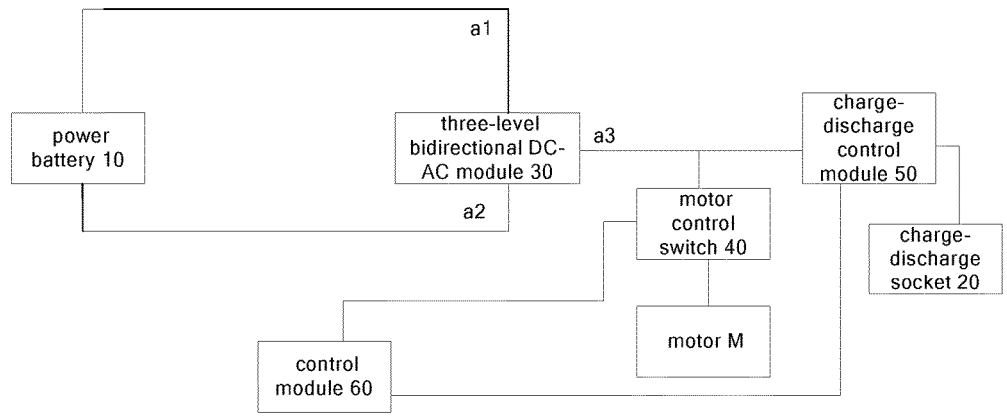
FIG. 1 is a schematic diagram of a power system for an electric vehicle according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The following description provides a plurality of embodiments or examples configured to achieve different structures of the present disclosure. In order to better describe the present disclosure, components and dispositions of the particular embodiment are described in the following, which are only explanatory and should not be construed to limit the present disclosure. In addition, the present disclosure may repeat the reference number and/or letter in different embodiments for the purpose of simplicity and clarity, and the repeat does not indicate the relationship of the plurality of embodiments and/or dispositions. Moreover, in the description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present disclosure, unless specified or limited otherwise, it should be noted that, terms "mounted," "connected" and "coupled" may be understood broadly, such as electronic connection or mechanical connection, inner communication between two elements, direct connection or indirect connection via intermediary. These having ordinary skills in the art should understand the specific meanings in the present disclosure according to specific situations.

With reference to the following descriptions and drawings, these and other aspects of embodiments of the present disclosure will be distinct. In the descriptions and drawings, some particular embodiments are described in order to show means of the principles of embodiments according to the present disclosure, however, it should be appreciated that the scope of embodiments according to the present disclosure is not limited by the specific descriptions. On the contrary, embodiments of the present disclosure include all the changes, alternatives, and modifications falling into the scope of the spirit and principles of the attached claims.

A charge control system for an electric vehicle according to embodiments of the present disclosure can be implemented based on a power system for an electric vehicle as described in the following.

According to embodiments of the present disclosure, the power system and the electric vehicle having the same are described in the following with reference to the drawings.

As shown in FIG. 1, the power system for the electric vehicle according to an embodiment of the present disclosure includes a power battery 10, a charge-discharge socket 20, a motor M for the electric vehicle, a three-level bidirectional DC-AC module 30, a motor control switch 40, a charge-discharge control module 50 and a control module 60.

The three-level bidirectional DC-AC module 30 has a first DC terminal a1 connected with a first terminal of the power battery 10 and a second DC terminal a2 connected with a second terminal of the power battery 10. The three-level bidirectional DC-AC module 30 is configured to implement a DC-AC conversion. The motor control switch 40 has a first terminal connected with an AC terminal a3 of the three-level bidirectional DC-AC module 30 and a second terminal connected with the motor M. The charge-discharge control module 50 has a first terminal connected with the AC terminal a3 of the three-level bidirectional DC-AC module 30 and a second terminal connected with the charge-discharge socket 20. The control module 60 is connected with the motor control switch 40 and a third terminal of the charge-discharge control module 50 respectively and is configured to control the motor control switch 40 and the charge-discharge control module 50 according to a current working mode of the power system, such that the vehicle can switch between a driving mode and a charge-discharge mode.

Moreover, in some embodiments of the present disclosure, the current working mode of the power system may include the driving mode and the charge-discharge mode. In other words, the working mode of the electrical vehicle may include the driving mode and the charge-discharge mode. It should be noted that the charge-discharge mode means that the electric vehicle is either in a charging mode or in a discharging mode.

When the power system is in the driving mode, the control module 60 controls the motor control switch 40 to turn on to drive the motor M normally, and controls the charge-discharge control module 50 to turn off. It should be noted that the motor control switch 40 may also include two switches K3 and K4 connected with a two-phase input to the motor, or even one switch, provided that the control on the motor may be realized. Therefore, other embodiments will not be described in detail herein.

When the power system is in the charge-discharge mode, the control module 60 controls the motor control switch 40 to turn off to stop the motor M and controls the charge-discharge control module 50 to turn on so as to start the three-level bidirectional DC-AC module 30, such that an external power source can charge the power battery 10 normally. The first DC terminal a1 and the second DC terminal a2 of the three-level bidirectional DC-AC module 30 are connected with a positive terminal and a negative terminal of a DC bus of the power battery 10 respectively.

Figure 2:
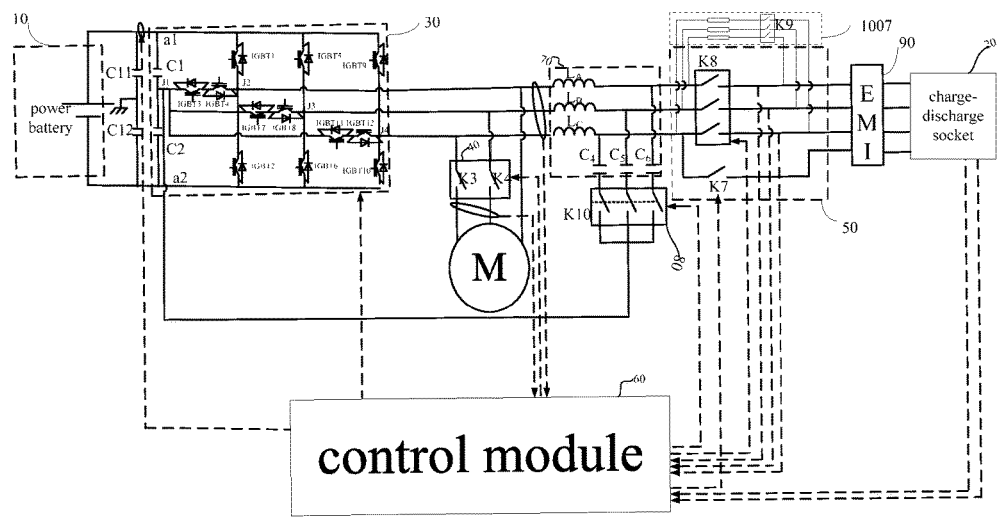
FIG. 2 is a circuit diagram of a power system for an electric vehicle according to an embodiment of the present disclosure.

In an embodiment of the present disclosure, as shown in FIG. 2, the three-level bidirectional DC-AC module 30 includes a first capacitor C1, a second capacitor C2, and a first IGBT1 to a twelfth IGBT12.

Specifically, the first capacitor C1 and the second capacitor C2 are connected in series. The first capacitor C1 has a first terminal connected with the first terminal of the power battery 10 and a second terminal connected with a first terminal of the second capacitor C2. The second capacitor C2 has a second terminal connected with the second terminal of the power battery 10, in which a first node J1 is defined between the first capacitor C1 and the second capacitor C2. In other words, the first capacitor C1 and the second capacitor C2 are connected between the first DC terminal a1 and the second DC terminal a2 of the three-level bidirectional DC-AC module 30. The first IGBT1 and a second IGBT2 are connected in series and are connected between the first DC terminal a1 and the second DC terminal a2 of the three-level bidirectional DC-AC module 30, in which a second node J2 is defined between the first IGBT1 and the second IGBT2. A third IGBT3 and a fourth IGBT4 are connected in series and are connected between the first node J1 and the second node J2. A fifth IGBT5 and a sixth IGBT6 are connected in series and are connected between the first DC terminal a1 and the second DC terminal a2 of the three-level bidirectional DC-AC module 30, in which a third node J3 is defined between the fifth IGBT5 and the sixth IGBT6. A seventh IGBT7 and an eighth IGBT8 are connected in series and are connected between the first node J1 and the third node J3. A ninth IGBT9 and a tenth IGBT10 are connected in series and are connected between the first DC terminal a1 and the second DC terminal a2 of the three-level bidirectional DC-AC module 30, in which a fourth node J4 is defined between the ninth IGBT9 and the tenth IGBT10. An eleventh IGBT11 and a twelfth IGBT12 are connected in series and are connected between the first node J1 and the fourth node J4. The second node J2, the third node J3 and the fourth node J4 are configured as the AC terminal a3 of the three-level bidirectional DC-AC module.

As shown in FIG. 2, the power system for the electric vehicle further includes a first common-mode capacitor C11 and a second common-mode capacitor C12. The first common-mode capacitor C11 and the second common-mode capacitor C12 are connected in series and connected between the first terminal and the second terminal of the power battery 10, in which a node between the first common-mode capacitor C11 and the second common-mode capacitor C12 is grounded.

Generally, a leakage current may be large in an inverter and grid system without transformer isolation. Compared with a conventional two-level system, the power system according to embodiments of the present disclosure uses the three-level bidirectional DC-AC module 30. By using a three-level control and connecting the first common-mode capacitor C11 and the second common-mode capacitor C12 between the first terminal and the second terminal of the power battery 10, a common-mode voltage can be reduced by half in theory and the large leakage current problem generally existing in controllers can also be solved. A leakage current at an AC side can also be reduced, thus satisfying electrical system requirements of different countries.

In an embodiment of the present disclosure, as shown in FIG. 2, the power system for the electric vehicle further includes a filtering module 70, a filtering control module 80 and an EMI-filter module 90.

The filtering module 70 is connected between the three-level bidirectional DC-AC module 30 and the charge-discharge control module 50, and is configured to eliminate a harmonic wave. As shown in FIG. 2, the filtering module 70 includes inductors LA, LB, LC connected in parallel and capacitors C4, C5, C6 connected in parallel. The inductor LA is connected with the capacitor C6 in series; and the inductor LB is connected with the capacitor C5 in series and the inductor LC is connected with the capacitor C4 in series.

A shown in FIG. 2, the filtering control module 80 is connected between the first node J1 and the filtering module 70. The control module 60 controls the filtering control module 80 to turn off when the power system is in the driving mode. The filtering control module 80 may be a capacitor switching relay and may include a contactor K10. The EMI-filter module 90 is connected between the charge-discharge socket 20 and the charge-discharge control module 50 and is mainly configured to filter interference of conduction and radiation.

It should be noted that a position of the contactor K10 in FIG. 2 is merely exemplary. In other embodiments of the present disclosure, the contactor K10 may be disposed at other positions, provided that the filtering module 70 can be turned off by using the contactor K10. For example, in another embodiment of the present disclosure, the contactor K10 can be connected between the three-level bidirectional DC-AC module 30 and the filtering module 70.

In an embodiment of the present disclosure, as shown in FIG. 2, the charge-discharge control module 50 further includes a three-phase switch K8 and/or a single-phase switch K7 configured to implement a three-phase or a single-phase charge-discharge.

In some embodiments of the present disclosure, when the power system is in the driving mode, the control module 60 controls the motor control switch 40 to turn on so as to drive the motor M normally, and controls the charge-discharge control module 50 to turn off. In this way, a direct current from the power battery 10 is inverted into an alternating current via the three-level bidirectional DC-AC module 30 and the alternating current is transmitted to the motor M. The motor M can be controlled by a revolving transformer decoder technology and a space vector pulse width modulation (SVPWM) control algorithm.

When the power system is in the charge-discharge mode, the control module 60 controls the motor control switch 40 to turn off so as to stop the motor M, and controls the charge-discharge control module 50 to turn on. This enables the external power source such as a three-phase current or a single-phase current can charge the power battery 10 normally via the charge-discharge socket 20. In other words, by detecting a charge connection signal, an AC grid power system and a vehicle battery management information, a controllable rectification function may be implemented via the bidirectional DC-AC module 30, and the power battery 10 may be charged by the single-phase power source and/or the three-phase power source.

With the power system for the electric vehicle according to embodiments of the present disclosure by adopting the three-level bidirectional DC-AC module, the common-mode voltage and the leakage current are reduced. In addition, by employing the three-level bidirectional DC-AC module 30, a common-mode voltage is reduced, a leakage current is decreased and a harmonic wave is weakened. Furthermore, a DC-DC voltage increasing and decreasing module is not necessarily required in embodiments of the present disclosure. This enables a high power charging, reduces a bus voltage, improves the driving efficiency and shortens the charging time. For example, the driving efficiency may be up to 97%, and the charging time may be shortened to about 10 minutes. Besides, with the power system according to embodiments of the present disclosure, the electric vehicle may be charged without a dedicated charging pile, thus reducing cost and improving the user experience with the electric vehicle. Furthermore, the electric vehicle may be directly charged with an AC electricity, which significantly makes it more convenient to use the electric vehicle.

The charge control system for the electric vehicle according to embodiments of the present disclosure will be described in the following.

Figure 3A:
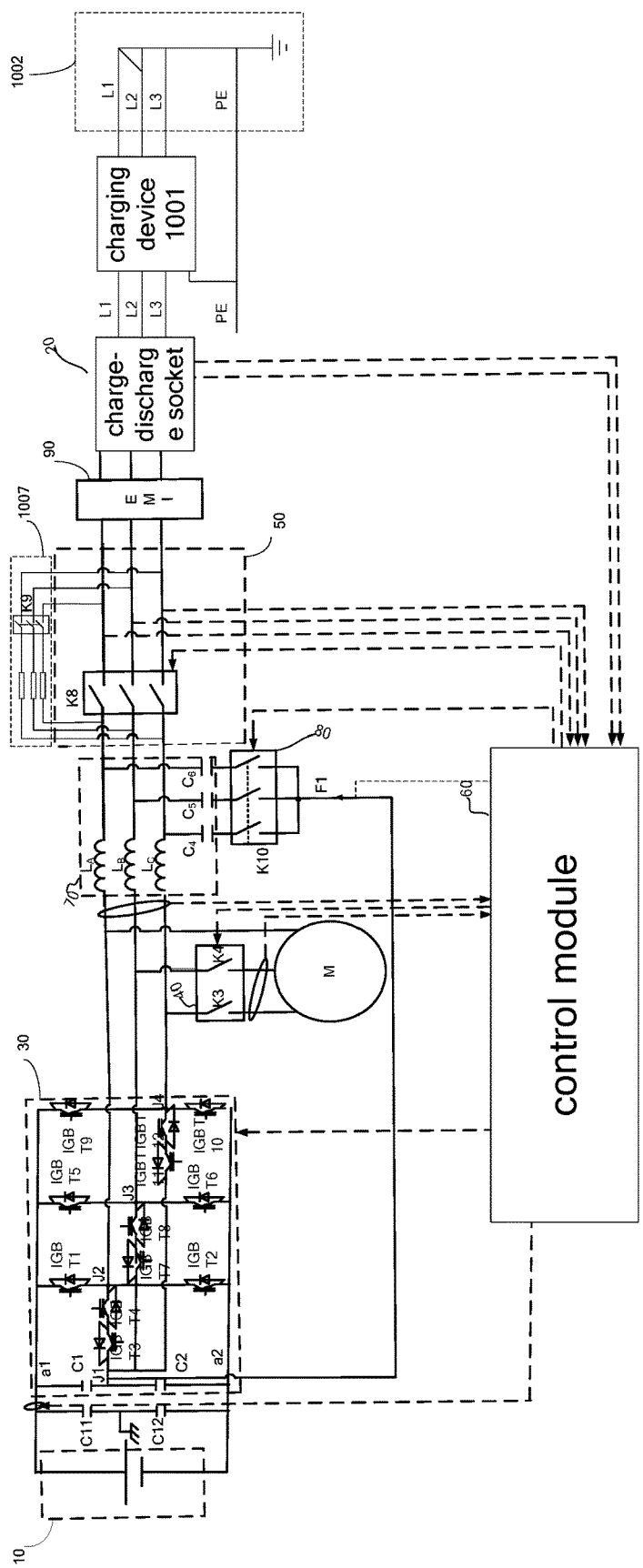
FIG. 3A is a circuit diagram of a charge control system for an electric vehicle according to an embodiment of the present disclosure.

As shown in FIG. 3A, in an embodiment, the charge control system for the electric vehicle includes a charge-discharge socket 20, a three-level bidirectional DC-AC module 30, a charge-discharge control module 50, a filtering module 70, and a control module 60.

Specifically, the three-level bidirectional DC-AC module 30 has a first DC terminal a1 that is connected with a first terminal of a power battery 10 of the electric vehicle and a second DC terminal a2 that is connected with a second terminal of the power battery 10. The charge-discharge control module 50 has a first terminal is connected with an AC terminal a3 of the three-level bidirectional DC-AC module 30 and a second terminal is connected with the charge-discharge socket 20. The filtering module 70 is connected between the AC terminal a3 of the three-level bidirectional DC-AC module 30 and the charge-discharge control module 50. The control module 60 is connected with a third terminal of the charge-discharge control module 50 and configured to control the charge-discharge control module 50 to turn on, to sample an output voltage of an external grid 1002 by using a connection midpoint of filtering capacitors in the filtering module as a reference point F1 (i.e., virtual sampling point). The control module 60 is also configured to control the three-level bidirectional DC-AC module according to the output voltage of the external grid so as to control the external grid to charge the power battery, when the external grid 1002 is in an angle connection mode and a current working mode of the electric vehicle is a charge-discharge mode.

As shown in FIG. 3A, in an embodiment, the charge control system may further include a charging device 1001, and the charging device 1001 is connected between the external grid 1002 and the he charge-discharge socket 20. For example, the charging device 1001 may be a charging pile.

As shown in FIG. 3A, the charge control system further includes a motor control switch 40, and the motor control switch 40 has a first terminal is connected with the AC terminal a3 of the three-level bidirectional DC-AC module 30 and a second terminal is connected with a motor M for the electric vehicle. The control module 60 is connected with a third terminal of the motor control switch 40 and is configured to control the motor control switch 40 to turn off, when the current working mode of the electric vehicle is the charge-discharge mode.

Specifically, in an embodiment of the present disclosure, the three-level bidirectional DC-AC module 30 includes a first capacitor C1, a second capacitor C2, and twelve IGBTs (IGBT1 to IGBT12).

The first capacitor C1 and the second capacitor C2 are connected in series. The first capacitor C1 has a first terminal connected with the first terminal of the power battery 10 and a second terminal connected with a first terminal of the second capacitor C2. The second capacitor C2 has a second terminal connected with the second terminal of the power battery 10, in which a first node J1 is defined between the first capacitor C1 and the second capacitor C2. In other words, the first capacitor C1 and the second capacitor C2 are connected between the first DC terminal a1 and the second DC terminal a2 of the three-level bidirectional DC-AC module 30. The first IGBT1 and a second IGBT2 are connected in series and are connected between the first DC terminal a1 and the second DC terminal a2 of the three-level bidirectional DC-AC module 30, in which a second node J2 is defined between the first IGBT1 and the second IGBT2. A third IGBT3 and a fourth IGBT4 are connected in series and are connected between the first node J1 and the second node J2. A fifth IGBT5 and a sixth IGBT6 are connected in series and are connected between the first DC terminal a1 and the second DC terminal a2 of the three-level bidirectional DC-AC module 30, in which a third node J3 is defined between the fifth IGBT5 and the sixth IGBT6. A seventh IGBT7 and an eighth IGBT8 are connected in series and are connected between the first node J1 and the third node J3. A ninth IGBT9 and a tenth IGBT10 are connected in series and are connected between the first DC terminal a1 and the second DC terminal a2 of the three-level bidirectional DC-AC module 30, in which a fourth node J4 is defined between the ninth IGBT9 and the tenth IGBT10. An eleventh IGBT11 and a twelfth IGBT12 are connected in series and are connected between the first node J1 and the fourth node J4. The second node J2, the third node J3 and the fourth node J4 are configured as the AC terminal a3 of the three-level bidirectional DC-AC module.

As shown in FIG. 3A, in an embodiment, the charge control system further includes the first common-mode capacitor C11 and the second common-mode capacitor C12. The first common-mode capacitor C11 and the second common-mode capacitor C12 are connected in series and connected between the first terminal and the second terminal of the power battery 10, in which the node between the first common-mode capacitor C11 and the second common-mode capacitor C12 is grounded.

Generally, a leakage current is large in an inverter and grid system without transformer isolation. Compared with a conventional two-level system, the energy control device 1005 according to embodiments of the present disclosure uses the three-level bidirectional DC-AC module 30. By using a three-level control and connecting the first common-mode capacitor C11 and the second common-mode capacitor C12 between the first terminal and the second terminal of the power battery 10, a common-mode voltage can be reduced by half in theory and the large leakage current problem generally existing in controllers can also solved. A leakage current at an AC side can also be reduced, thus satisfying electrical system requirements of different countries.

In an embodiment of the present disclosure, as shown in FIG. 3A, the charge control system further includes the filtering control module 80, the EMI-filter module 90 and a pre-charging control module 1007.

The filtering module 70 is connected between the three-level bidirectional DC-AC module 30 and the charge-discharge control module 50 and is configured to eliminate a harmonic wave. As shown in FIG. 3A, the filtering module 70 includes inductors LA, LB, LC connected in parallel and capacitors C4, C5, C6 connected in parallel. The inductor LA is connected with the capacitor C6 in series, the inductor LB is connected with the capacitor C5 in series, and the inductor LC is connected with the capacitor C4 in series.

As shown in FIG. 3A, the filtering control module 80 is connected between the first node J1 and the filtering module 70, and the control module 60 controls the filtering control module 80 to turn off when the power system is in the driving mode. A terminal of the filtering control module 80 connected with the first node J1 is configured as the reference point F1. The filtering control module 80 may be a capacitor switching relay and may include a contactor K10.

A shown in FIG. 3A, the EMI-filter module 90 is connected between the charge-discharge socket 20 and the charge-discharge control module 50 and is mainly configured to filter interference of conduction and radiation. The pre-charging control module 1007 is connected with the charge-discharge control module 50 in parallel and is configured to charge the capacitors C4, C5, C6, in the filtering module 70. The pre-charging control module 1007 includes three resistors connected in parallel and a three-phase contactor K9. When the vehicle is in the discharging mode. The control module 60 controls the filtering control module 80 to turn on and controls the pre-charging control module 1007 to pre-charge the capacitors C4, C5, C6 in the filtering module 70 until a voltage of the capacitors C4, C5, C6 in the filtering module 70. In this way, since there is a voltage applied to the virtual sampling point F1 when the capacitors C4, C5, C6 perform discharging, the control module 60 may sample a voltage output from the charging device 1001 via the reference point F1.

It should be noted that a position of the contactor K10 in FIG. 3A is merely exemplary. In other embodiments of the present disclosure, the contactor K10 may be disposed at other positions, provided that the filtering module 70 can be turned off by using the contactor K10. For example, in another embodiment of the present disclosure, the contactor K10 can be connected between the three-level bidirectional DC-AC module 30 and the filtering module 70. In this case, the connection midpoint of the filtering capacitors C4, C5, C6 is connected with the first node J1, and thus the reference point F1 is the first node J1.

In an embodiment of the present disclosure, as shown in FIG. 3A, the charge-discharge control module 50 further includes a three-phase switch K8 and/or a single-phase switch K7 configured to implement a three-phase or a single-phase charge-discharge.

When the external grid 1002 with a star type connection mode charges the power battery of the electric vehicle by the charge pile, the control module 60 can sample a three-phase voltage of the external grid 1002 via a neutral line. However, the power battery of the electric vehicle cannot be charged by the external grid 1002 with an angle connection mode and without a neutral line. With the charge control system for an electric vehicle according to embodiments of the present disclosure, the reference point is provided. As shown in FIG. 3A, the reference point (i.e. the virtual reference point F1) is the connection midpoint of filtering capacitors in the filtering module 70. When the contactor K9 and the contactor K10 are turned on, the filtering capacitors are charged by the AC electricity. When the filtering capacitors are discharged, the virtual reference point F1 is applied with a voltage. In this case, the control module 60 can sample the three-phase voltage by the virtual reference point F1, and output the sampled voltages to a DSP for identification and response. In this way, the power battery of the electric vehicle may be charged.

The charge control system for the electric vehicle according to embodiments of the present disclosure may accommodate different grid systems, thus effectively improving the usability of a charging system for the electric vehicle, and improving the user convenience of the electric vehicle. In addition, by employing the three-level bidirectional DC-AC module, a common-mode voltage is reduced, a leakage current is decreased, and a harmonic wave is weakened. Furthermore, a DC-DC voltage increasing and decreasing module is not necessarily required in embodiments of the present disclosure, which enables a high power charging, reduces a bus voltage, improves a driving efficiency and shortens a charging time.

According to a second aspect of embodiments of the present disclosure, an electric vehicle is provided. The electric vehicle includes the charge control system according to embodiments of the first aspect of the present disclosure.

The electric vehicle according to embodiments of the present disclosure may accommodate different grid systems, thus effectively improving the usability of a charging system for the electric vehicle, and improving the user convenience of the electric vehicle. In addition, by employing the three-level bidirectional DC-AC module, a common-mode voltage is reduced, a leakage current is decreased, and a harmonic wave is weakened. Furthermore, a DC-DC voltage increasing and decreasing module is not necessarily required in embodiments of the present disclosure, which enables a high power charging, reduces a bus voltage, improves a driving efficiency and shortens a charging time.

Figure 3B:
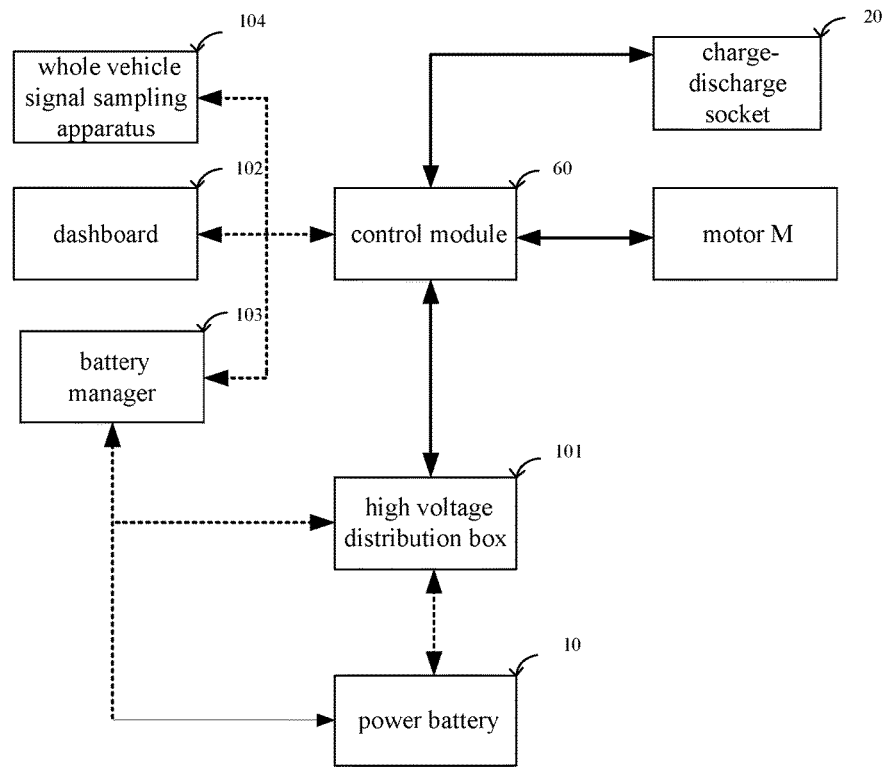
FIG. 3B is a schematic diagram of a power system for an electric vehicle according to an embodiment of the present disclosure.

As shown in FIG. 3B, in an embodiment, the power system may further include the high voltage distribution box 101, a dashboard 102, a battery manager 103, and a whole vehicle signal sampling apparatus 104. The control module 60 is connected with the high voltage distribution box 101, the dashboard 102, the battery manager 103 and the whole vehicle signal sampling apparatus 104 respectively. The battery manager 103 is connected with the high voltage distribution box 101 and the power battery 10.

Figure 4:
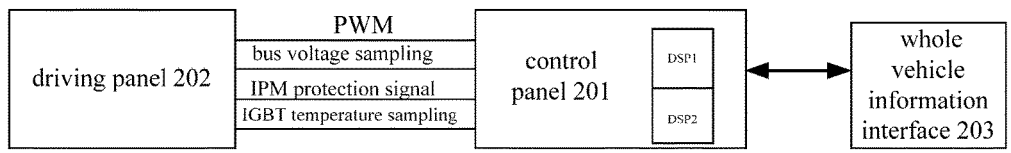
FIG. 4 is a schematic diagram of a control module according to an embodiment of the present disclosure.

In an embodiment of the present disclosure, as shown in FIG. 4, the control module 60 includes a control panel 201 and a driving panel 202. The control panel 201 includes two high-speed digital signal processing chips (i.e., DSP1 and DSP2). The two DSPs are connected and communicate with a whole vehicle information interface 203. The two DSPs are configured to receive a bus voltage sampling signal, an IPM protection signal and an IGBT temperature sampling signal and so on sent from a driving unit on the driving panel 202, and to output a pulse width modulation (PWM) signal to the driving unit simultaneously.

Accordingly, the power system for the electric vehicle according to embodiments of the present disclosure has numerous functions including motor diving, vehicle control, AC charging, grid connection power supplying, off-grid on-load and vehicle-to-vehicle charging. Moreover, the power system is established not by simply and physically combining various functional modules, but by introducing peripheral devices based on a motor driving control system, thus saving space and cost to a maximum extent and improving a power density.

Specifically, functions of the power system for the electric vehicle are simply described below.

1. Motor Driving Function

A DC electricity from the power battery 10 is inverted into an AC electricity by means of the three-level bidirectional DC-AC module 30, and the AC electricity is transmitted to the motor M. The motor M can be controlled by a revolving transformer decoder technology and a space vector pulse width modulation (SVPWM) control algorithm.

Figure 5:
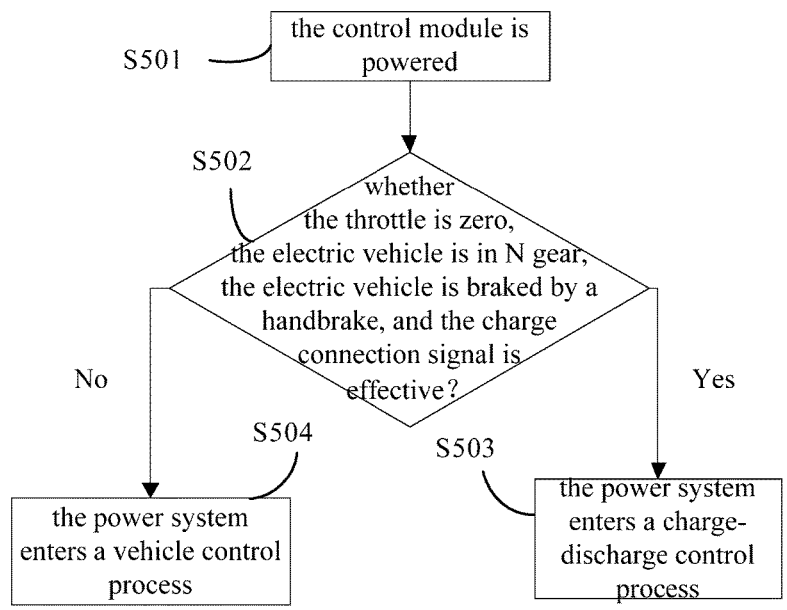
FIG. 5 is a flow chart of determining a function of a power system for an electric vehicle according to an embodiment of the present disclosure.

In other words, when the power system is powered to operate, as shown in FIG. 5, a process of determining a function of the power system includes the following steps.

At step 501, the control module 60 is turned on.

At step 502, it is determined whether the throttle is zero, and the electric vehicle is in N gear, and the electric vehicle is braked by a handbrake, and the charge connection signal (i.e. a CC signal) is effective (i.e. the charge-discharge socket 20 is connected with a charging connector, such as the charging gun). If yes, step 503 is executed; if no, step 504 is executed.

At step 503, the power system enters a charge-discharge control process.

At step 504, the power system enters a vehicle control process.

After step 504, the control module 60 controls the motor control switch 40 to turn on, the power system is in the driving mode, the control module 60 samples the whole vehicle information and drives the motor M according to the whole vehicle information.

Figure 6:
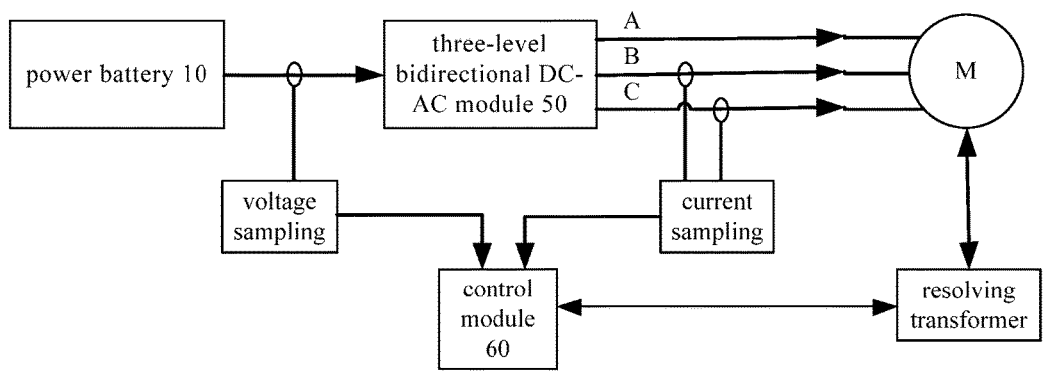
FIG. 6 is a schematic diagram showing a power system for an electric vehicle according to an embodiment of the present disclosure executing a motor driving control function.

A motor driving control function is performed. As shown in FIG. 6, the control module 60 sends a PWM signal to control the three-level bidirectional DC-AC module 30 to invert the DC electricity from the power battery 10 into the AC electricity and transmit the AC electricity to the motor M. Subsequently, the control module 60 obtains a rotor location via a resolving transformer and samples the bus voltage and B-phase and C-phase currents of the motor to make the motor M operate precisely. In other words, the control module 60 adjusts the PWM signal according to the B-phase and C-phase current signals of the motor sampled by a current sensor and feedback information from the resolving transformer, such that the motor M may operate precisely.

Thus, by sampling the throttle, brake and gear information of the whole vehicle and determining a current operation state of the vehicle, an accelerating function, a decelerating function and an energy feedback function can be implemented. The whole vehicle can thus operate safely and reliably under any condition, thus ensuring the safety, dynamic performance and the comfort of the passengers.

Figure 7:
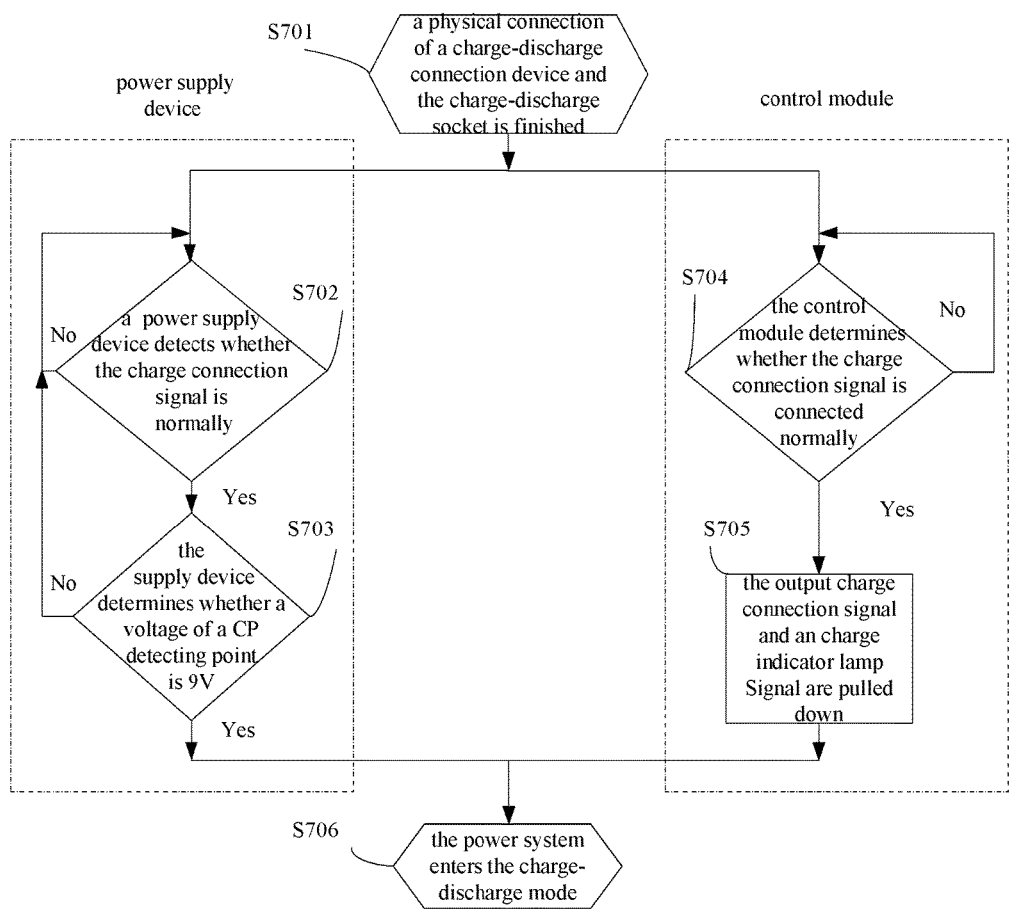
FIG. 7 is a flow chart of determining whether to start a charge-discharge function for a power system for an electric vehicle according to an embodiment of the present disclosure.

2. Charge-Discharge Function (1) Connection Confirmation and Start of Charge-Discharge Function As shown in FIG. 7, a process of determining whether to start the charge-discharge function of the power system includes the following steps.

At step 701, the physical connection between the charging connector and the charge-discharge socket 20 is finished.

At step 702, a power supply apparatus determines whether the charge connection signal (i.e. the CC signal) is normal. If yes, step 703 is executed; if no, step 702 is returned for another determining.

At step 703, the power supply apparatus determines whether a voltage of a CP detecting point is 9V. If yes, step 706 is executed; if no, step 702 is returned for another determining. 9V is a predetermined value and is just exemplary.

At step 704, the control module 60 determines whether the charge connection signal (i.e. the CC signal) is normal. If yes, step 705 is executed; if no, step 704 is returned for another determining.

At step 705, the output charge connection signal and a charge indicator lamp signal are pulled down.

At step 706, the power system performs the charge or discharge function, that is, the power system is in the charge-discharge mode.

Figure 8:
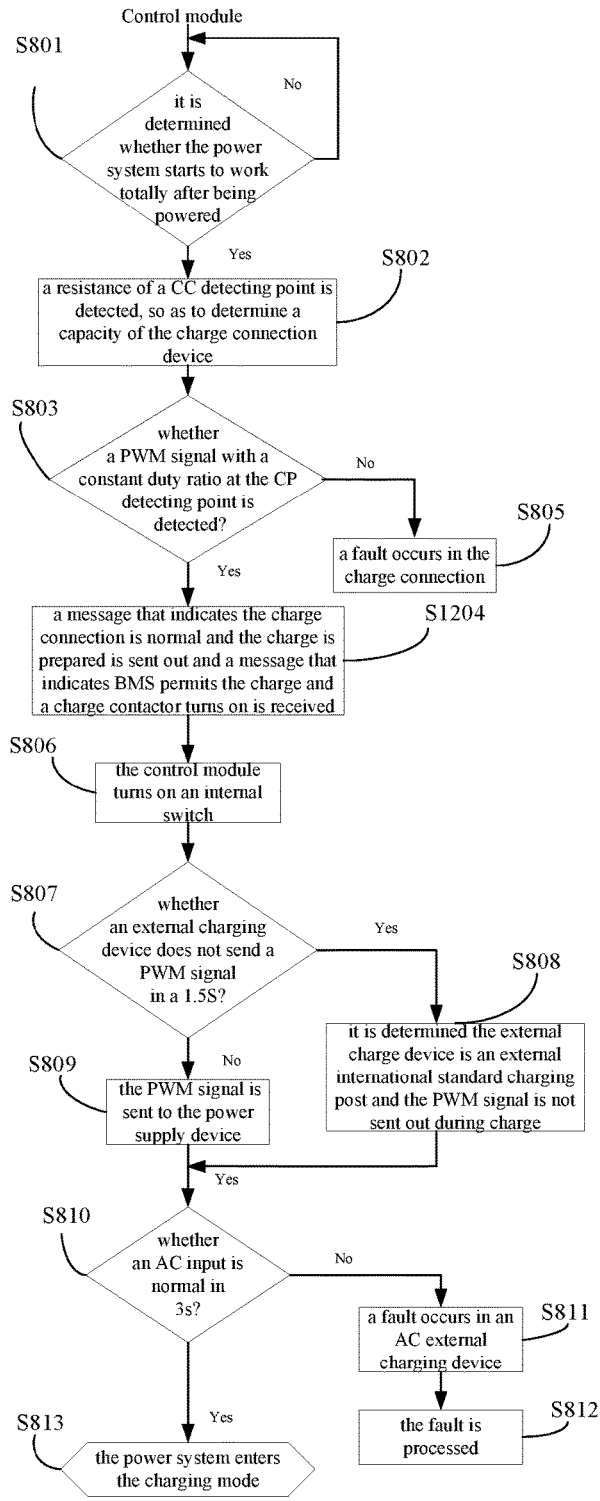
FIG. 8 is a flow chart of controlling a power system for an electric vehicle in a charging mode according to an embodiment of the present disclosure.

As shown in FIG. 8, a process of controlling the power system in the charging mode includes following steps.

At step 801, it is determined whether the power system starts to operate totally after being powered. If yes, step 802 is executed; if no, step 801 is returned for another determining.

At step 802, a resistance of a CC (charge connection) detecting point is detected to determine a capacity of the charging connector.

At step 803, it is determined whether a PWM signal with a constant duty ratio at the CP detecting point is detected. If yes, step 804 is executed; if no, step 805 is executed.

At step 804, a message indicating the charge connection is normal and the charge is prepared is sent out and a message indicating BMS permits the charge and a charge contactor turns on is received, and step 806 is executed.

At step 805, a fault occurs in the charge connection.

At step 806, the control module 60 turns on an internal switch.

At step 807, it is determined whether an AC external charging apparatus does not send a PWM wave in a predetermined time such as 1.5 seconds. If yes, step 808 is executed; if no, step 809 is executed.

At step 808, it is determined that the external charging apparatus is an external national standard charging post and the PWM wave is not sent out during the charge.

At step 809, the PWM wave is sent to the power supply apparatus.

At step 810, it is determined whether an AC input is normal in a predetermined time such as 3 seconds. If yes, step 813 is executed; if no, step 811 is executed.

At step 811, a fault occurs in the AC external charging apparatus.

At step 812, the fault is processed.

At step 813, the power system enters the charging stage.

In other words, as shown in FIGS. 7 and 8, after the power supply apparatus and the control module 60 detect themselves and no fault occurs therein, the capacity of the charging connector may be determined by detecting a voltage of the CC signal, and it is determined whether the charging connector is connected totally by detecting the CP signal. After it is determined that the charging connector is connected totally, the message indicating the charge connection is normal and the charge is prepared and sent out, and the three-phase switch K8 is controlled to turn on and thus the charge or discharge is prepared, i.e., functions such as the AC charge function (G to V, grid to vehicle), the off-grid on-load function (V to L, vehicle to load), the grid connection function (V to G, vehicle to grid) and the vehicle-to-vehicle charging function (V to V, vehicle to vehicle), may be set via the dashboard.

(2) AC Charge Function (G to V)

When the power system receives a charging instruction from the dashboard 102, the control module 60 sets a proper charging power according to a power supply capability of the charging pile and a capacity of a charging cable. Moreover, the control module 60 samples information of a grid, determines an electric system of the grid and selects control parameters according to the electric system of the grid. After the control parameters are selected, the control module 60 controls the contactor K10 to turn on and then controls the three-phase switch K8 to turn on. At this time, the control module 60 controls the three-level bidirectional DC-AC module 30 to rectify the AC electricity. A minimum charging current is selected from a maximum charging current allowed by the battery manager, a maximum current flow capacity allowed by the charging pile and a maximum output power of the control module and used as a predetermined target charging current and a closed-loop current control is performed on the power system. The in-vehicle power battery can then be charged.

(3) Off-Grid On-Load Function (V to L)

When the power system receives a V to L instruction from the dashboard 102, it is first determined whether a state of charge (SOC) of the power battery 10 is in an allowable discharging range. If yes, an output electric system is selected according to the V to L instruction. A maximum output power is selected intelligently and control parameters are given according to the rated current of the charging connector, and then the power system enters a control process. First, the control module 60 controls the three-phase switch K8 and the contactor K10 to turn on and the three-level bidirectional DC-AC module 30 inverts the DC electricity into the AC electricity, and thus electric apparatuses may be powered by the AC electricity directly via a dedicated charge socket.

(4) Grid Connection Function (V to G)

When the power system receives a V to G instruction from the dashboard 102, it is first determined whether the state of charge (SOC) of the power battery 10 is in the allowable discharging range. If yes, an output electric system is selected according to the V to G instruction. A maximum output power is selected intelligently and controls parameters are given according to the rated current of the charging connector, and the power system enters a control process. First, the control module 60 controls the three-phase switch K8 and the contactor K10 to turn on and controls the three-phase bidirectional DC-AC module 30 to invert the DC electricity into the AC electricity. And the control module 60 performs the closed-loop current control on the power system according to a predetermined target discharging current and the phase currents fed back from a current sampling, so as to implement the grid connection discharging.

(5) Vehicle-to-Vehicle Charging Function (V to V)

The V to V function requires a dedicated connection plug. When the power system determines that the charge connection signal (i.e. CC signal) is effective and the connection plug is a dedicated charge plug for the V to V function by detecting a level of the connection plug, the power system is prepared for an instruction from the dashboard. For example, assuming vehicle A charges vehicle B, the vehicle A is set in a discharging state, i.e. the vehicle A is set to perform the off-grid on-load function. The control module in vehicle A sends the message indicating the charge connection is normal and the charge is prepared to the battery manager 103. The battery manager 103 controls a charge or discharge circuit to perform the pre-charging, and sends the message indicating the charge is permitted and the charging contactor turns on to the control module after the pre-charging is finished. Then, the power system performs the discharging function and sends the PWM signal. After the vehicle B receives the charging instruction, the power system therein detects a CP signal which determines that the vehicle A is prepared to supply power, and the control module 60 sends a normal connection message to the battery manager. After receiving the message, the battery manager 103 finishes the pre-charging process and informs the control module 60 that the whole power system is prepared for the charge. Then, the vehicle-to-vehicle charging function (V to V) starts, and thus vehicles can charge each other.

In other words, after the power system is powered, when the V to V instruction from the dashboard 102 is received by the control module 60, the charge connection signal and relevant information on whole vehicle battery management are detected, the vehicle is set in an AC power output state and sends the CP signal by simulating a charging box to communicate with the vehicle to be charged. For example, a vehicle A is set in the discharging mode and the control module 60 therein simulates the power supply apparatus to implement functions thereof, and the vehicle B to be charged is connected with the vehicle A via a dedicated charging wire, and thus the vehicle-to-vehicle charging function is implemented.

Figure 9:
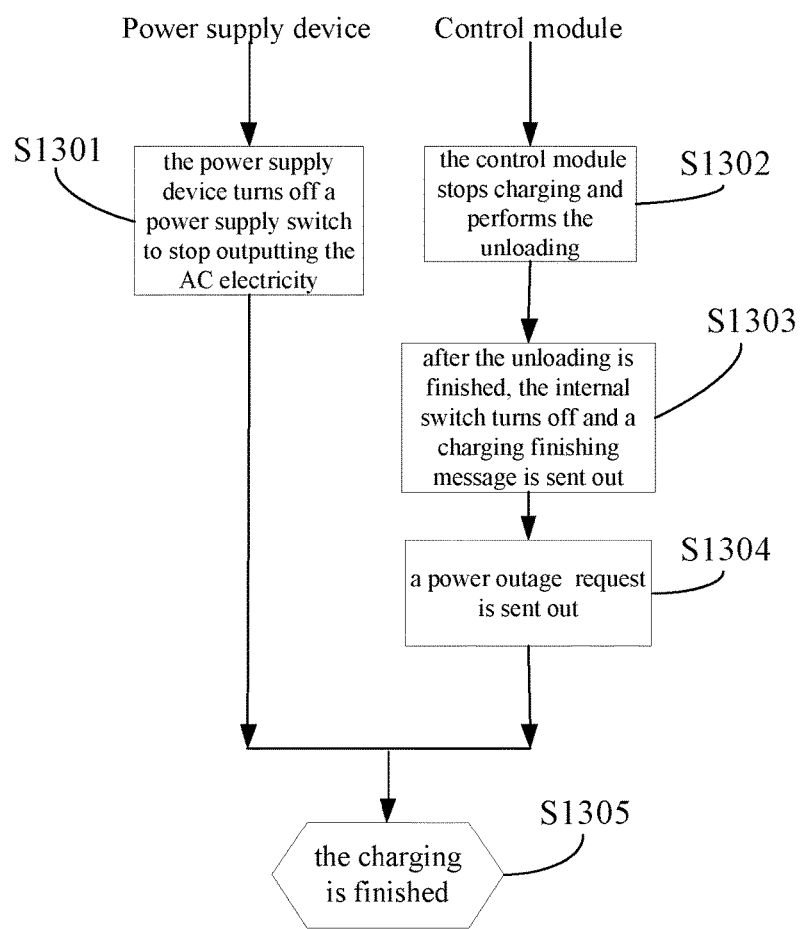
FIG. 9 is a flow chart of controlling a power system for an electric vehicle according to an embodiment of the present disclosure, when ending charging the electric vehicle.

In an embodiment, as shown in FIG. 9, a process of controlling the power system when the charging of the electric vehicle is finished includes the following steps.

At step 1301, the power supply apparatus turns off a power supply switch to stop outputting the AC electricity, and step 1305 is executed.

At step 1302, the control module stops the charge and performs the unloading, and step 1303 is executed.

At step 1303, after the unloading is finished, the internal switch turns off and a charge complete message is sent out.

At step 1304, a power outage request is sent out.

At step 1305, the charge is finished.

Figure 10:
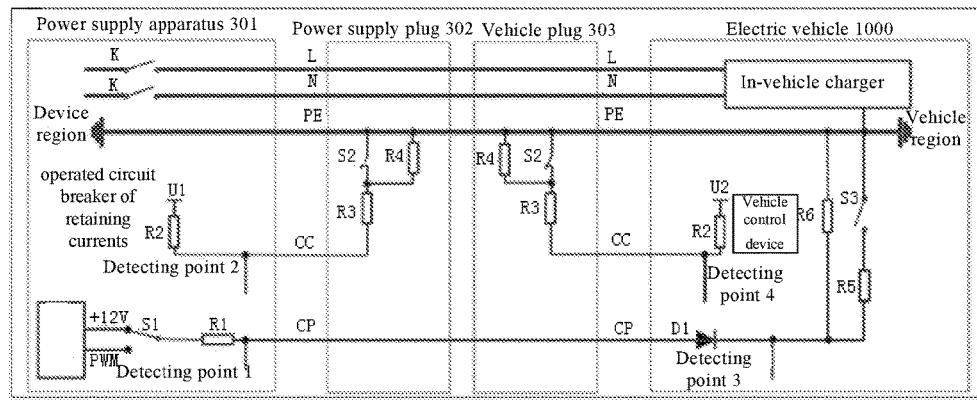
FIG. 10 is a circuit diagram of a connection between an electric vehicle according to an embodiment of the present disclosure and a power supply apparatus.

As shown in FIG. 10, a power supply apparatus 301 is connected with a vehicle plug 303 of an electric vehicle 1000 via a power supply plug 302 to charge the electric vehicle 1000. The power system of the electric vehicle 1000 detects a CP signal via a detecting point 3 and detects a CC signal via a detecting point 4, and the power supply apparatus 301 detects the CP signal via a detecting point 1 and detects the CC signal via a detecting point 2. After the charge is finished, the internal switches S2 in both the power supply plug 302 and the vehicle plug 303 are controlled to turn off.

In another embodiment, a plurality of power systems connected in parallel can be used in the electric vehicle to charge the power battery. For example, two power systems connected in parallel are used to charge the power battery, and the two power systems use a common control module.

In the embodiment of the present disclosure, a charging system for the electric vehicle includes the power battery 10, a first charging branch, a second charging branch and a control module 60.

The first charging branch includes a first rectifying unit (i.e., a three-level bidirectional DC-AC module 30) and a first charging interface (i.e., a charge socket). The second charging branch includes a second rectifying unit (i.e., a three-level bidirectional DC-AC module 30) and a second charging interface (i.e., a charge socket). The power battery is connected with the first charging interface via the first rectifying unit in turns and is connected with the second charging interface via the second rectifying unit. The control module is connected with the first rectifying unit and the second rectifying unit respectively and is configured to control the grid to charge the power battery respectively via the first charging branch and the second charging branch, when receiving a charging signal.

Figure 11:
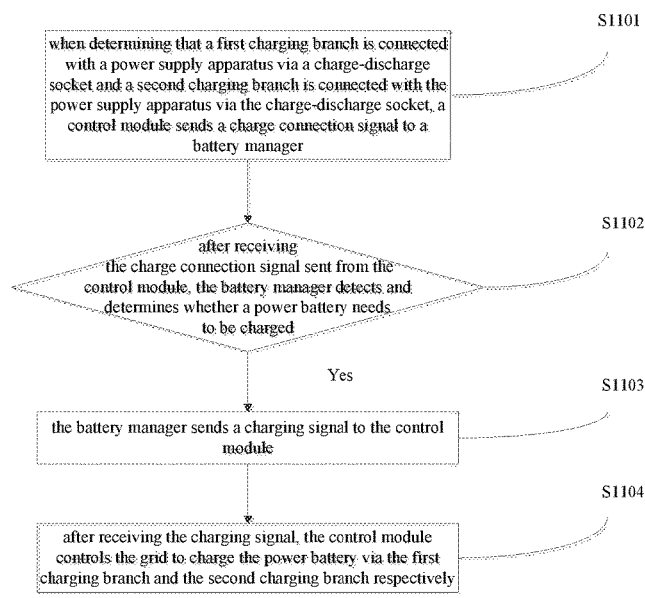
FIG. 11 is a flow chart of a method for controlling charging an electric vehicle according to an embodiment of the present disclosure.

In addition, as shown in FIG. 11, an embodiment of the present disclosure provides a method for controlling charging an electric vehicle. The method includes following steps.

At step S1101, when a control module determines that a first charging branch is connected with a power supply apparatus via a charge-discharge socket and a second charging branch is connected with the power supply apparatus via the charge-discharge socket, a control module sends a charge connection signal to a battery manager.

At step S1102, after receiving the charge connection signal sent from the control module, the battery manager detects and determines whether a power battery needs to be charged. If yes, a next step is executed.

At step S1103, the battery manager sends a charging signal to the control module.

At step S1104, after receiving the charging signal, the control module controls the grid to charge the power battery via the first charging branch and the second charging branch respectively.

With the charging system for the electric vehicle and the method for controlling charging the electric vehicle according to the above embodiments of the present disclosure, the control module controls the grid to charge the power battery via the first charging branch and the second charging branch respectively. The charging power of the electric vehicle is increased and the charging time is shortened. Embodiments of the present disclosure thus implement a fast charge with reduced charging time.

In some embodiments, the power system for the electric vehicle has a wide compatibility and performs a single-phase/three-phase switching function, and it can adapted to various electric systems of different countries.

Figure 12:
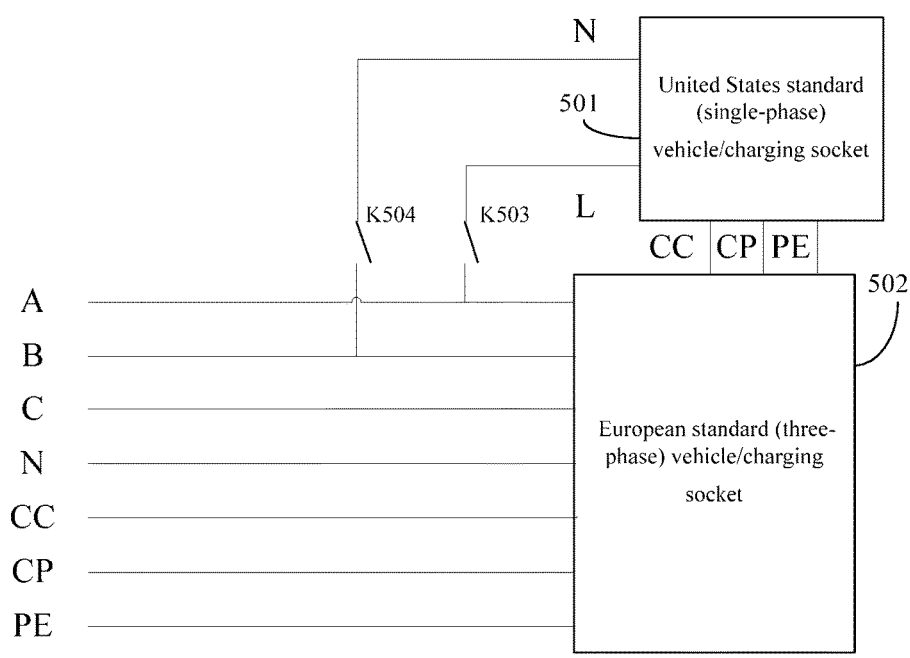
FIG. 12 is a schematic diagram of a charge-discharge socket according to an embodiment of the present disclosure.

Specifically, as shown in FIG. 12, the charge-discharge socket 20 has a function of switching between two charging sockets (such as a United States standard charging socket and a European standard charging socket). The charge-discharge socket 20 includes a single-phase charging socket 501 such as the United States standard charging socket, a three-phase charging socket 502 such as the European standard charging socket and two high-voltage connectors K503 and K504. A CC terminal, a CP terminal and a CE terminal are common terminals for the single-phase charging socket 501 and the three-phase charging socket 502. The single-phase charging socket 501 has an L-phase wire and an N-phase wire connected with an A-phase wire and a B-phase wire of the three-phase charging socket 502 via the connectors K503 and K504 respectively. When receiving a single-phase charge or discharge instruction, the control module 60 controls the connectors K503 and K504 to turn on, such that the A-phase and B-phase wires of the three-phase charging socket 502 are connected with the L-phase and N-phase wires of the single-phase charging socket 501 respectively. The three-phase charging socket 502 does not operate, and instead of the L-phase and N-phase wires of the single-phase charging socket 501, the A-phase and B-phase wires of the three-phase charging socket 502 are connected with the charge plug, and thus the control module 60 can perform the single-phase charge function normally.

Alternatively, as shown in FIG. 2, a standard 7-core socket is used and the single-phase switch K7 is added between the N-phase and B-phase wires. When receiving the single-phase charge or discharge instruction, the control module 60 controls the single-phase switch K7 to turn on to connect the B-phase wire with the N-phase wire. Then, the A-phase and B-phase wires are used as the L-phase and N-phase wires respectively, and the connection plug should be a dedicated connection plug or a connection plug whose B-phase and C-phase wires are not used.

In other words, in some embodiments, the power system detects a voltage of the grid via the control module 60 and determines the frequency and the single-phase/three-phase of the grid by calculation, so as to obtain the grid electric system. Then, the control module 60 selects different control parameters according to a type of the charge-discharge socket 20 and the grid electric system. Furthermore, the control module 60 controls the three-level bidirectional DC-AC module 30 to rectify the alternating current controllably to obtain the DC electricity and to transmit the DC electricity to the power battery 10.

Figure 13:
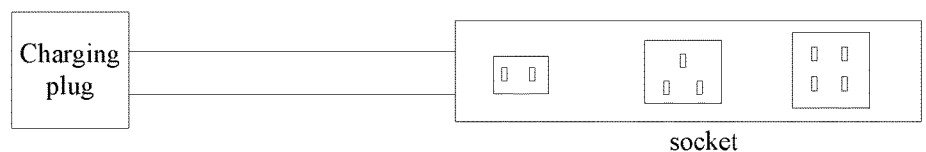
FIG. 13 is a schematic diagram of an off-grid on-load discharge plug according to an embodiment of the present disclosure.

In another embodiment, as shown in FIG. 13, an off-grid on-load discharging socket includes two-core, three-core and four-core sockets connected with a charge plug, and is configured to output single-phase, three-phase and four-phase electricity.

Figure 14:
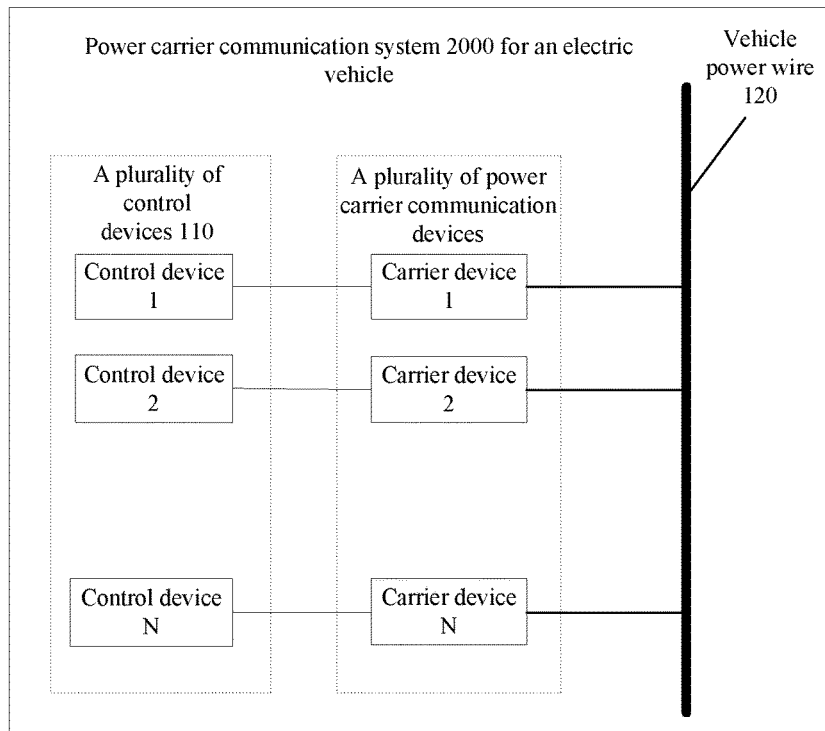
FIG. 14 is a block diagram of a power carrier communication system for an electric vehicle according to an embodiment of the present disclosure.

FIG. 14 is a block diagram of a power carrier communication system for an electric vehicle according to an embodiment of the present disclosure.

As shown in FIG. 14, the power carrier communication system 2000 includes a plurality of control devices 110, a vehicle power cable 120 and a plurality of power carrier communication devices 130.

Specifically, each of the control devices 110 has a communication interface, in which the communication interface may be, for example, but is not limited to, a serial communication interface SCI. The vehicle power cable 120 supplies power to the control devices 110, and the control devices 110 communicate with each other via the vehicle power cable 120. The power carrier communication devices 130 correspond to the control devices 110 respectively, and the control devices 110 are connected with corresponding power carrier communication devices 130 via their own communication interfaces respectively, and the power carrier communication devices 130 are connected with each other via the vehicle power cable 120. The power carrier communication devices 130 obtain a carrier signal from the vehicle power cable 120 so as to demodulate the carrier signal and send the demodulated carrier signal to the corresponding control device 110, and also receive and demodulate information sent from the corresponding control device 110 and send the demodulated information to the vehicle power cable 120.

With reference to FIG. 14, the plurality of control devices 110 include a control device 1 to a control device N (N is larger than or equal to 2 and is an integer). The plurality of power carrier communication devices 130 corresponding to the plurality of control devices 110 include a power carrier communication device 1 to a power carrier communication device N. For example, when the control device 1 needs communicate with the control device 2, the control device 2 first sends a carrier signal to the power carrier communication device 2. The power carrier communication device 2 demodulates the carrier signal and sends the demodulated carrier signal to the vehicle power cable 120. Then, the power carrier communication device 1 obtains the carrier signal from the vehicle power cable 120, and sends the demodulated carrier signal to the control device 1.

Figure 15:
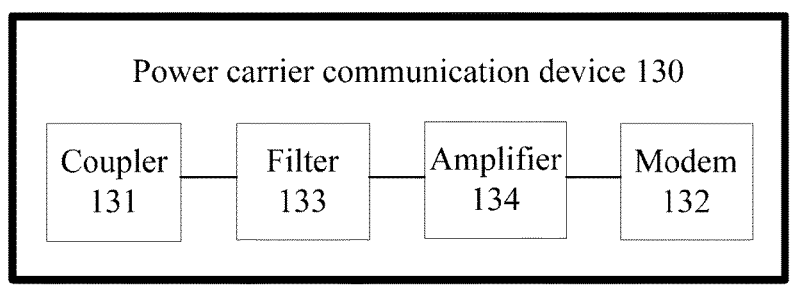
FIG. 15 is a block diagram of a power carrier communication device.

As shown in FIG. 15, each of the power carrier communication devices 130 includes a coupler 131, a filter 133, an amplifier 134 and a modem 132 connected sequentially.

Figure 16:
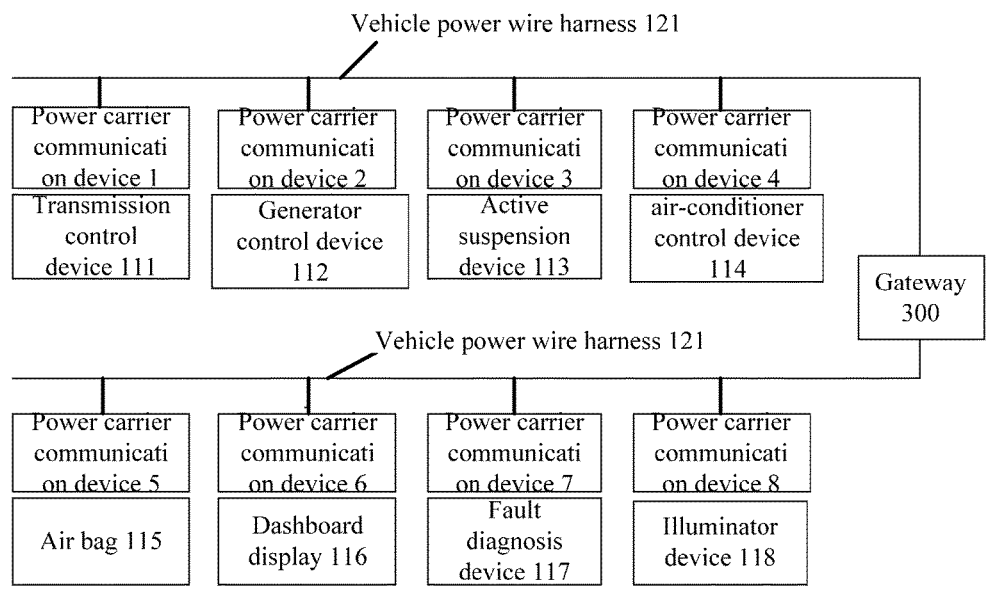
FIG. 16 is a schematic diagram of communications between eight power carrier communication devices and corresponding control devices.

Further, as shown in FIG. 16, the plurality of power carrier communication devices 130, such as eight power carrier communication devices 1-8, are connected with a gateway 300 via a vehicle power cable bundle 121 and a vehicle power cable bundle 122, and each power carrier communication device corresponds to one control device. For example, the power carrier communication device 1 corresponds to a transmission control device 111. The power carrier communication device 2 corresponds to a generator control device 112. The power carrier communication device 3 corresponds to an active suspension device 113. The power carrier communication device 4 corresponds to an air-conditioner control device 114. The power carrier communication device 5 corresponds to an air bag 115. The power carrier communication device 6 corresponds to a dashboard display 116. The power carrier communication device 7 corresponds to a fault diagnosis device 117. The power carrier communication device 8 corresponds to an illumination device 118.

Figure 17:
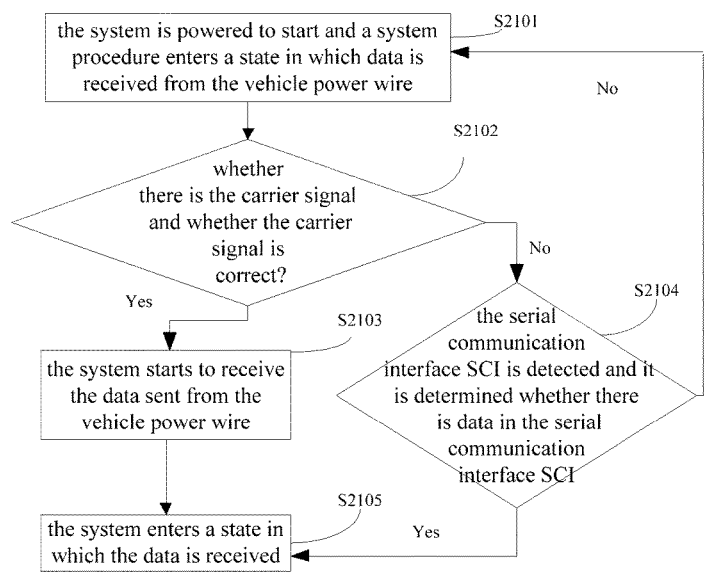
FIG. 17 is a flow chart of a method for receiving data by a power carrier communication system.

In this embodiment, as shown in FIG. 17, a method for receiving data by a power carrier communication system includes following steps.

At step 2101, the system is powered to start and a system program enters a state in which data is received from a vehicle power cable.

At step 2102, it is determined whether there is a carrier signal and whether the carrier signal is correct. If yes, step 2103 is executed; if no, step 2104 is executed.

At step 2103, the system starts to receive the data sent from the vehicle power cable, and step 2105 is executed.

At step 2104, the serial communication interface (SCI) is detected and it is determined whether there is data in the serial communication interface (SCI). If yes, step 2105 is executed; if no, step 2101 is returned.

At step 2105, the system enters a state in which the data is received.

With the power carrier communication system for the electric vehicle according to embodiments of the present disclosure, a data transmission and sharing among various control systems in the electric vehicle can be achieved without increasing internal cable bundles of the vehicle. Moreover, a power carrier communication using the power cable as a communication medium avoids constructing and investing a new communication network, thus reducing the manufacturing cost and maintenance difficulty.

Figure 18:
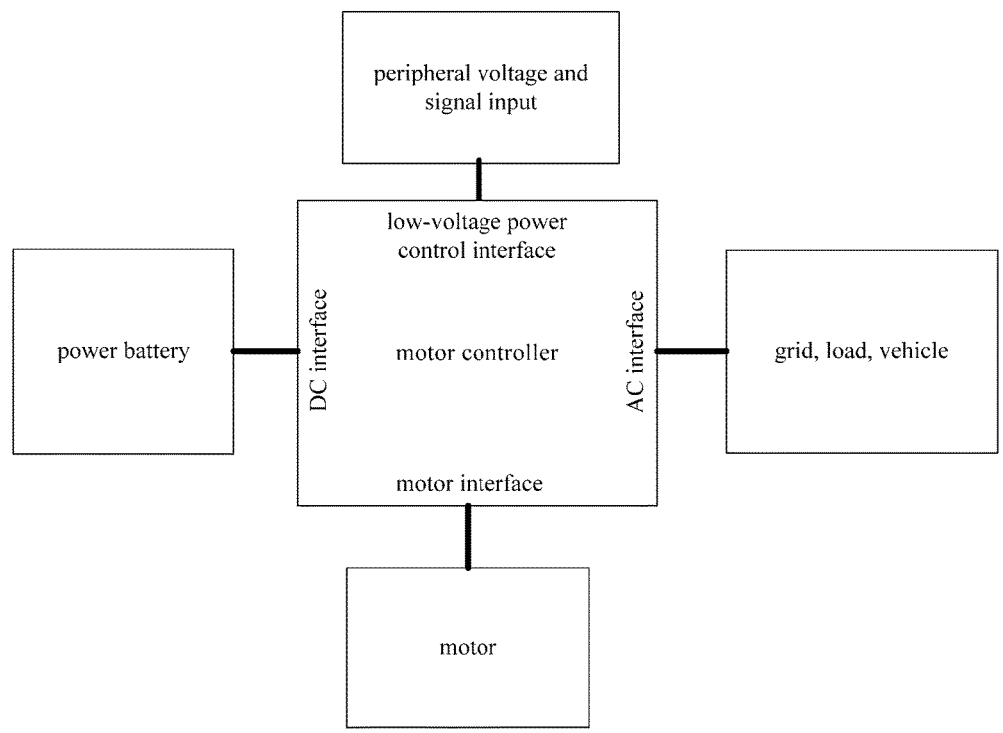
FIG. 18 is a schematic diagram showing a connection between a motor controller for an electric vehicle and other parts of the electric vehicle according to an embodiment of the present disclosure.

FIG. 18 is a schematic diagram of a connection between a motor controller for an electric vehicle and other parts of the electric vehicle according to an embodiment of the present disclosure. The motor controller is connected with a power battery via a DC interface, and connected with a grid via an AC interface to charge the power battery, and connected with a load or other vehicles via an AC interface so as to discharge the load or the other vehicles. In the embodiment of the present disclosure, the motor controller for the electric vehicle includes a three-level bidirectional DC-AC module, a motor control switch, a charge-discharge control module and a control module.

The three-level bidirectional DC-AC module has a first DC terminal connected with a first terminal of the power battery and a second DC terminal connected with a second terminal of the power battery. The motor control switch has a first terminal connected with an AC terminal of the three-level bidirectional DC-AC module and a second terminal connected with the motor. The charge-discharge control module has a first terminal connected with the AC terminal of the three-level bidirectional DC-AC module and a second terminal connected with the charge-discharge socket. The control module is connected with the motor control switch and the charge-discharge control module respectively and is configured to control the motor control switch and the charge-discharge control module according to a current working mode of a power system.

The motor controller according to embodiments of the present disclosure has a bidirectional property, i.e. the motor controller not only may implement the charging of the electric vehicle by an external grid. For example, the direct charging of the electric vehicle with an AC electricity, but also may implement the discharging of the electric vehicle to an external apparatus. Therefore, the motor control has various functions, thus facilitating the use of a user largely. In addition, with the three-level control, the common-mode voltage is greatly reduced, the leakage current is decreased, the harmonic wave is weakened, and the charging efficiency is improved. Moreover, a charging generator is not required in the system by using the AC electricity to directly charge the electric vehicle, thus saving a cost of a charging station. In addition, the electric vehicle can be charged by using a local AC electricity anytime and anywhere.

In an embodiment of the present disclosure, when the power system is in the driving mode, the control module controls the motor control switch to turn on and controls the charge-discharge control module to turn off. When the power system is in the charge-discharge mode, the control module controls the motor control switch to turn off and controls the charge-discharge control module to turn off to start the three-level bidirectional DC-AC module.

In an embodiment of the present disclosure, the three-level bidirectional DC-AC module includes: a first capacitor and a second capacitor connected in series and connected between the first DC terminal and the second DC terminal of the three-level bidirectional DC-AC module in which a first node is defined between the first capacitor and the second capacitor. A first IGBT and a second IGBT connected in series and connected between the first DC terminal and the second DC terminal of the three-level bidirectional DC-AC module, in which a second node is defined between the first IGBT and the second IGBT. A third IGBT and a fourth IGBT connected in series and connected between the first node and the second node. A fifth IGBT and a sixth IGBT connected in series and connected between the first DC terminal and the second DC terminal of the three-level bidirectional DC-AC module, in which a third node is defined between the fifth IGBT and the sixth IGBT. A seventh IGBT and an eighth IGBT connected in series and connected between the first node and the third node. A ninth IGBT and a tenth IGBT connected in series and connected between the first DC terminal and the second DC terminal of the three-level bidirectional DC-AC module, in which a fourth node is defined between the ninth IGBT and the tenth IGBT. An eleventh IGBT and a twelfth IGBT connected in series and connected between the first node and the fourth node, wherein the second node, the third node, and the fourth node are configured as the AC terminal of the three-level bidirectional DC-AC module.

In an embodiment, the power system for the electric vehicle further includes a first common-mode capacitor and a second common-mode capacitor. The first common-mode capacitor and the second common-mode capacitor are connected in series and connected between the first terminal and the second terminal of the power battery, in which a node between the first common-mode capacitor and the second common-mode capacitor is grounded.

In an embodiment, the power system for the electric vehicle includes a filtering module. The filtering module is connected between the AC terminal of the three-level bidirectional DC-AC module and the charge-discharge control module.

In an embodiment, the power system for the electric vehicle includes a filtering control module. The filtering control module is connected between the first node and the filtering module, and the control module controls the filtering control module to turn off when the vehicle is in a driving mode.

In an embodiment, the power system for the electric vehicle includes an EMI-filter module. The EMI-filter module is connected between the charge-discharge socket and the charge-discharge control module and is configured to filter interference of conduction and radiation.

In an embodiment, the charge-discharge control module further includes a three-phase switch and/or a single-phase switch configured to implement a three-phase or a single-phase charge-discharge.

In an embodiment, the motor controller is connected with the power battery and is also connected with loads, the grid and other electric vehicles.

Any procedure or method described in the flow charts or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions. This would be understood by those skilled in the art which embodiments of the present disclosure belong to.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art, such as discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A charge control system for an electric vehicle, comprising:
    a charge-discharge socket;
    a three-level bidirectional DC-AC module having a first DC terminal configured to connect with a first terminal of a power battery of the electric vehicle and a second DC terminal configured to connect with a second terminal of the power battery;
    a charge-discharge control module having a first terminal connected with an AC terminal of the three-level bidirectional DC-AC module and a second terminal connected with the charge-discharge socket;
    a filtering module having a first terminal connected to the AC terminal of the three-level bidirectional DC-AC module and a second terminal connected to the charge-discharge control module; and
    a control module connected with a third terminal of the charge-discharge control module and configured to control the charge-discharge control module to turn on, to sample an output voltage of an external grid by using a connection midpoint of filtering capacitors in the filtering module as a reference point, and to control the three-level bidirectional DC-AC module according to the output voltage of the external grid to control the external grid to charge the power battery, when the external grid is in an angle connection mode and the electric vehicle is in a charge-discharge mode;
    wherein the three-level bidirectional DC-AC module comprises:
        a first capacitor and a second capacitor connected in series and connected between the first DC terminal and the second DC terminal of the three-level bidirectional DC-AC module, a first node is defined between the first capacitor and the second capacitor;

a first IGBT and a second IGBT connected in series and connected between the first DC terminal and the second DC terminal of the three-level bidirectional DC-AC module, a second node is defined between the first IGBT and the second IGBT;

a third IGBT and a fourth IGBT connected in series and connected between a third terminal of the filtering module and the second node;

a fifth IGBT and a sixth IGBT connected in series and connected between the first DC terminal and the second DC terminal of the three-level bidirectional DC-AC module, a third node is defined between the fifth IGBT and the sixth IGBT;

a seventh IGBT and an eighth IGBT connected in series and connected between the third terminal of the filtering module and the third node;

a ninth IGBT and a tenth IGBT connected in series and connected between the first DC terminal and the second DC terminal of the three-level bidirectional DC-AC module, a fourth node is defined between the ninth IGBT and the tenth IGBT; and an eleventh IGBT and a twelfth IGBT connected in series and connected between the third terminal of the filtering module and the fourth node;

wherein the second node, the third node and the fourth node are configured as the AC terminal of the three-level bidirectional DC-AC module.

2. The charge control system according to claim 1, further comprising:
a motor control switch having a first terminal connected with the AC terminal of the three-level bidirectional DC-AC module and a second terminal configured to connect with a motor for the electric vehicle;
wherein the control module is connected with a third terminal of the motor control switch, and is configured to control the motor control switch to turn off when the electric vehicle is the charge-discharge mode.

3. The charge control system according to claim 1, further comprising:
a first common-mode capacitor and a second common-mode capacitor connected in series and connected between the first terminal and the second terminal of the power battery, in which a node between the first common-mode capacitor and the second common-mode capacitor is grounded.

4. The charge control system according to claim 1, further comprising:
a filtering control module connected between the first node and the third terminal of the filtering module, in which the control module controls the filtering control module to turn off when the electric vehicle is a driving mode.

5. The charge control system according to claim 4, wherein a terminal of the filtering control module connected with the first node is configured to be the reference point.

6. The charge control system according to claim 1, wherein the filtering module comprises three filtering capacitors connected in parallel.

7. The charge control system according to claim 1, further comprising:
an EMI-filter module connected between the charge-discharge socket and the charge-discharge control module and configured to filter interference of conduction and radiation.

8. The charge control system according to claim 1, further comprising:
a pre-charging control module connected with the charge-discharge control module in parallel and configured to pre-charge the filtering capacitors in the filtering module.

9. The charge control system according to claim 1, wherein the charge-discharge control module comprises:
a three-phase switch and/or a single-phase switch configured to implement a three-phase charge-discharge or a single-phase charge-discharge.

10. An electric vehicle comprising the charge control system for an electric vehicle according to claim 1.

* * * * *